(12) United States Patent
Liu et al.

(10) Patent No.: US 6,849,304 B1
(45) Date of Patent: Feb. 1, 2005

(54) METHOD OF FORMING LUBRICANT FILMS (75) Inventors: Jianwei Liu, Fremont, CA (US); Michael Stirniman, Fremont, CA (US); Dan Castro, San Jose, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 304 days.

(21) Appl. No.: 10/086,848

(22) Filed: Mar. 4, 2002

Related U.S. Application Data (60) Provisional application No. 60/276,766, filed on Mar. 16, 2001.

(51) Int. Cl.$^7$ .............................. G11B 5/725; C08F 2/46
(52) U.S. Cl. ....................... 427/493; 427/508; 427/521; 427/131
(58) Field of Search ................................ 427/493, 508, 427/521, 131

(56) References Cited

U.S. PATENT DOCUMENTS

| | | |
|---|---|---|
| 3,025,279 A | 3/1962 | Barr |
| 3,104,983 A | 9/1963 | Tarwater et al. |
| 3,810,874 A | 5/1974 | Mitsch et al. |
| 3,814,741 A | 6/1974 | Caporiccio et al. |
| 4,132,681 A | 1/1979 | Field et al. |
| 4,404,247 A | 9/1983 | Dominguez-Burguette et al. |
| 4,446,193 A | 5/1984 | Afzali-Ardakani et al. |
| 4,486,500 A | 12/1984 | Naruo et al. |
| 4,526,833 A | 7/1985 | Burguette et al. |
| 4,543,275 A | 9/1985 | Akashi et al. |
| 4,569,962 A | 2/1986 | Burguette et al. |
| 4,588,656 A | 5/1986 | Kitamoto et al. |
| 4,642,246 A | 2/1987 | Janssen et al. |
| 4,645,703 A | 2/1987 | Suzuki et al. |
| 4,671,999 A | 6/1987 | Burguette et al. |
| 4,681,925 A | 7/1987 | Strepparola et al. |
| 4,686,146 A | 8/1987 | Karle et al. |
| 4,699,835 A | 10/1987 | Takeuchi et al. |
| 4,701,375 A | 10/1987 | Nishimatsu et al. |
| 4,705,699 A | 11/1987 | Burguette et al. |
| 4,721,640 A | 1/1988 | Kato et al. |
| 4,758,471 A | 7/1988 | Arioka et al. |
| 4,828,899 A | 5/1989 | Arioka et al. |
| 4,835,032 A | 5/1989 | Arioka et al. |
| 4,849,291 A | 7/1989 | Yacobucci et al. |
| 4,880,687 A | 11/1989 | Yokoyama et al. |
| 4,960,609 A | 10/1990 | Homola et al. |
| 4,992,316 A | 2/1991 | Ogawa |
| 5,030,478 A | 7/1991 | Lin et al. |

(List continued on next page.)

FOREIGN PATENT DOCUMENTS

JP 07-224102 * 8/1995

OTHER PUBLICATIONS

Lee et al. May 1993 "Enhanced Tribological Performance of Rigid disk by Using Chemically Bonded Lubricant" *J. Vac. Sci. Technol.* A, vol. 11(3), pp. 711–714.

Tian et al. Jul. 1993 "Tribological Characteristics of Liquid Lubricant on Magnetic Disks Treated by Far–UV Radiation" *J. Tribology*, vol. 115, pp 400–405.

Vurens et al. Jan. 1993 "The Mechanism of Ultraviolet Bonding of Perfluoropolyether Lubricants" *IEEE Transactions on Magnetics*, vol. 29, pp 282–285.

*Primary Examiner*—Stevan A. Resan
(74) *Attorney, Agent, or Firm*—McDermott Will & Emery LLP (57) ABSTRACT

Thin lubricant films are prepared on optical and magnetic substrates by applying a lubricant having at least one UV polymerizable group onto the substrate and polymerizing the lubricant by UV irradiation at elevated temperatures. Embodiments include applying a lubricant having at least two acrylate groups onto a magnetic recording disc, heating the magnetic recording disc from about 50° C. to about 150° C. and exposing the lubricant to UV radiation substantially free of wavelengths of 200 nm or less.

20 Claims, 6 Drawing Sheets

U.S. PATENT DOCUMENTS

| | | | |
|---|---|---|---|
| 5,049,410 A | 9/1991 | Johary et al. | |
| 5,055,359 A | 10/1991 | Tsuno et al. | |
| 5,080,982 A | 1/1992 | Yamamoto et al. | |
| 5,118,525 A | 6/1992 | Chino et al. | |
| 5,143,787 A | 9/1992 | Frew et al. | |
| 5,178,954 A | 1/1993 | Norman et al. | |
| 5,188,747 A | 2/1993 | Kai et al. | |
| 5,266,724 A | 11/1993 | Kai et al. | |
| 5,279,877 A | 1/1994 | Uchiyama et al. | |
| 5,331,487 A | 7/1994 | Gregory et al. | |
| 5,409,738 A | 4/1995 | Matsunuma et al. | |
| 5,534,322 A | 7/1996 | Ueyama et al. | |
| 5,543,203 A | 8/1996 | Tani et al. | |
| 5,545,478 A | 8/1996 | Lin et al. | |
| 5,578,355 A * | 11/1996 | Hirata et al. | 428/64.3 |
| 5,591,481 A | 1/1997 | Takahashi et al. | |
| 5,618,617 A | 4/1997 | Uchida et al. | |
| 5,631,041 A | 5/1997 | Kanaizuka et al. | |
| 5,631,081 A | 5/1997 | Lin et al. | |
| 5,661,618 A | 8/1997 | Brown et al. | |
| 5,783,320 A | 7/1998 | Shimazaki et al. | |
| 5,858,536 A | 1/1999 | Yanagisawa | |
| 5,874,169 A | 2/1999 | Falcone | |
| 5,912,061 A | 6/1999 | Uchida et al. | |
| 5,919,560 A | 7/1999 | Nishimori | |
| 6,071,609 A | 6/2000 | Furutani et al. | |
| 6,096,385 A | 8/2000 | Yong et al. | |
| 6,096,694 A | 8/2000 | Tei et al. | |
| 6,099,762 A | 8/2000 | Lewis | |
| 6,110,584 A | 8/2000 | Hiratsuka et al. | |
| 6,589,641 B1 * | 7/2003 | Stirniman et al. | 428/216 |
| 6,617,011 B2 * | 9/2003 | Wu et al. | 428/216 |

* cited by examiner

METHOD OF FORMING LUBRICANT FILMS

CROSS-REFERENCE TO RELATED APPLICATION

This application claims priority from U.S. provisional patent application Ser. No. 60/276,766 filed Mar. 16, 2001 entitled Methods to Improve the Properties of a Lubricant Film, the entire disclosure of which is incorporated herein by reference.

BACKGROUND OF THE INVENTION

Magnetic and optical media are widely employed in various information storage applications, particularly in the computer industry for information recording and retrieval purposes. A magnetic medium as used in computer-related application, comprises a non-magnetic disk-shaped substrate, e.g., of glass, ceramic, glass-ceramic composite, polymer, metal, or metal alloy, together with a plurality of thin film layers constituting the medium. The additional layers can include, a plating layer, e.g., of amorphous nickel-phosphorus (Ni-P); a polycrystalline underlayer, typically of chromium (Cr) or a Cr-based alloy such as chromium-vanadium (Cr-V); a magnetic layer, e.g., of a cobalt (Co)-based alloy; and a protective overcoat layer, typically of a carbon (C)-based material, e.g., diamond-like carbon ("DLC") having good tribological properties. Optical media can include a substrate together with operational layers, such as a reflective layer; e.g., of a metal or metal alloy; one or more rare-earth thermo-magnetic (RE-TM) alloy layers; one or more transparent dielectric layers; and a protective overcoat layer, e.g., a DLC layer, for functioning as reflective, transparent, writing, writing assist, and read-out layers, etc.

Magnetic and optical media are typically lubricated with a thin film comprised of a polymeric lubricant, e.g., a perfluoropolyether, to reduce wear and provide resistance to corrosion of any metal layers on the media. The application of the protective overcoat and lubricant are important for high durability and reliability of thin film recording media.

Fluoropolyether lubricants are of particular interest in lubricating recording media. These lubricants are suited to form lubricant topcoats on recording media because of their chemical inertness, low vapor pressure, low surface tension, high thermal stability, stability under high shear stress and good boundary lubrication properties. Among the many lubricants available, liquid perfluoropolyethers (PFPE) are the most typically used in forming topcoat lubricants on recording media.

Liquid lubrication of the disk surface encounters several problems, however, which limit its effectiveness in rotating storage media. For example, it is well known that non-bonded lubricants will spin off a thin film disk with a carbon overcoat. Typically, PFPE lubricants do not have a retention means so that when the disk rotates, the lubricant tends to spins off the disk. The depletion of the lubricant from the disk surface tends to increase friction between the disk and the read/write head.

A number of references disclose bonding lubricants to recording media with the use of WV radiation. For example, Lin et al., in U.S. Pat. No. 5,0303,478, teach bonding a lubricant to a carbon overcoat by irradiating the lubricant with UV radiation in a selected intensity and frequency range of 185–254 mm. Tian et al. disclose that far-UV irradiation treatment can be used to obtain bonded lubricants on magnetic recording disk surfaces. See e.g., Tian et al., "Tribological Characteristics of Liquid Lubricant on Magnetic Disks Treated By Far-UV Radiation" J. Tribology, Vol. 115, pp. 400–405 (1993).

In studying the mechanisms of UV bonding of perfluoropolyether lubricants, Vurens et al. teach that photoelectronic emission from the substrate is the cause of bonding of the lubricant. See, e.g., Vurens et al. "The Mechanism of Ultraviolet Bonding of Perfluoropolyether Lubricants" IEEE Transactions on Magnetics, Vol. 29, pp. 282–285 (1993). Vurens et al. teach that illumination with 185 nm UV light renders a lubricant film bonded to a substrate, while illumination with 254 nm light does not result in the formation of such a bonded film on certain substrates, such as amorphous carbon, silica and gold. It is believed, however, that the prior art has not recognized the advantages of the present invention.

Accordingly, a continuing need exists in the art for an improved lubricated recording medium. In particular there exists a need for an efficient, cost-effective method of manufacturing a recording medium with a lubricant topcoat exhibiting improved tribological performance and fly-stiction.

SUMMARY OF THE INVENTION

An advantage of the present invention is an efficient cost-effective method of manufacturing a recording medium having a lubricant topcoat.

Additional advantages and other features of the present invention will be set forth in part in the description which follows and in part will become apparent to those having ordinary skill in the art upon examination of the following or may be learned from the practice of the present invention. The advantages of the present invention may be realized and obtained as particularly pointed out in the appended claims.

According to the present invention, the foregoing and other aspects are achieved in part by a method of forming a thin lubricant film on a substrate. The method comprises applying a lubricant having at least one UV-polymerizable group on the substrate and polymerizing the lubricant by UV irradiation at an elevated temperature, e.g. above room temperature. The lubricant can be applied to recording media, such as an optical or magnetic recording medium and their equivalents.

In embodiments of the present invention, a perfluoropolyalkylether lubricant having at least one acrylyl group is applied to a substrate and is polymerized by exposing the lubricant to UV radiation while the substrate or lubricant is heated to above 30° C., e.g. while the substrate or lubricant is heated from about 50° C. to about 150° C.

Another aspect of the present invention is a method of forming a lubricant film on a substrate employing UV radiation that substantially excludes wavelengths of less than about 185 mm, e.g. less than about 200 nm. In an embodiment, the method comprises applying a lubricant having at least one UV-polymerizable group on a substrate; heating the substrate; and polymerizing the lubricant by exposing the lubricant to UV radiation having wavelengths from 200 nm to about 400 nm.

Additional advantages of the present invention will become readily apparent to those having ordinary skill in the art from the following detailed description, wherein the embodiments of the invention are described, simply by way of illustration of the best mode contemplated for carrying out the invention. As will be realized, the invention is capable of other and different embodiments and its several details are capable of modifications in various substantially equivalent respects, all without departing from the inven-

DESCRIPTION OF THE INVENTION

The present invention stems from the discovery that forming lubricant films by UV irradiation at elevated temperatures can afford several advantages. While the present invention affords certain advantages, it Is understood that these advantages need not be achieved to practice the claimed invention.

For example, it was discovered that by heating the substrate or a UV-active lubricant on the substrate, higher wavelength radiation can be employed to polymerize the UV-active lubricant on the substrate eliminating or reducing high frequency radiation during polymerization reduces or eliminates deleterious ozone formation. It was also discovered that a higher water contact angle can be achieved, which is among the more desirable properties of lubricant films over a recording media, by practicing the present invention. Another advantage of the present invention is that a thicker lubricant layer can be bonded to the recording media, particularly a thicker lubricant layer bonded on a carbon overcoat, thus affording improved protection and less lubricant spin-off from the media. A shorter UV irradiation time can also be achieved at elevated temperatures thus saving tremendous electrical energy in mass production (the energy used to produce UV radiation is believed to require more resources than the energy needed for heating).

Shorter UV exposure times are advantageous in reducing deleterious decomposition of the lubricant. It is believed that prolonged UV irradiation causes photo-degradation of lubricant molecules, which is detrimental to tribological performance. Exposing a UV-polymerizable lubricant at elevated temperatures tends to reduce UV exposure times, which in turn promotes tribological advantages over processes that do not employ elevated temperatures.

Heating the substrate and/or the lubricant has additional advantages in tending to remove ancillary contaminates, including the degraded lubricant fragments from the UV treatment, if formed, and typical impurities from the lubing process. These contaminates tend to desorb from the lubricant surface more rapidly at elevated temperature. The elimination of such contaminates tends to reduce stiction/ friction between the head-disc interface and improve media durability. An additional advantage of heating the lubricant and/or substrate manifests itself in being able to use UV wavelengths substantially free of the highs energy frequencies.

Upon investigation and experimentation it was discovered that, contrary to conventional approaches, the use of UV radiation that substantially excludes high energy wavelengths can be employed to polymerize a lubricant film on a recording medium. In one aspect of the present invention, a lubricant applied to a substrate is polymerized With UV radiation that is substantially free of wavelengths of 185 nm or less, e.g. substantially free of radiation less than about 200 nm, with the application of heat. The use of higher wavelengths, e.g. about 200–400 nm, offers the added advantage of reducing decomposition attendant on the lubricant with high frequency radiation. These high frequency and high-energy wavelengths also tend to form ozone during the exposure process. This is particularly true of radiation at about 185 nom. Thus, the elimination or substantial elimination of such high-energy radiation also reduces harmful ozone formation, which tends to be an environmental pollutant as well as the cause of deleterious effects on the surface of the lubricant. Without being bound to any theory, it is believed that the photoelectron emission thought to be responsible for bonding a lubricant to a substrate that occurs at 185 nm can occur at higher wavelengths when the substrate is heated. Thus, by heating the substrate the exposure of the lubricant to high frequency and high intensity radiation can be minimized as well as the length of time that is required for exposure of UV radiation in general. Hence, it is believed that practicing the present invention affords many advantages that were not recognized in the prior art.

In practicing the present invention, a lubricant is applied to a substrate, e.g., an optical or magnetic recording medium. The substrate is then subject to heat as, for example, by a convection oven or an infrared heating source or any other equivalent heating source. Alternatively, the lubricant can be heated and thereby heat the substrate. The heated substrate having the lubricant thereon is then exposed to UV radiation. In further embodiments of the present invention, the frequency range can be varied and the type of substrate can be varied all within the scope of the present inventive concept.

In one embodiment of the present invention, a lubricant topcoat is formed on a protective overcoat of a magnetic recording medium. The magnetic recording medium can comprise a composite of a magnetic layer on a non-magnetic substrate. In an embodiment of the present invention, an underlayer such is chromium or a chromium alloy is formed between the non-magnetic substrate and the magnetic layer.

The protective overcoat, formed on the magnetic layer, can comprise one or more layers of carbon, e.g. hydrogenated amorphous carbon or nitrogenated amorphous carbon. Hydrogenated amorphous carbon, for example, is hydrogen doped amorphous carbon, while nitrogenated amorphous carbon is nitrogen doped amorphous carbon. Other thin film materials that serve as a protective overcoat in accordance with embodiments of the present invention include silicon nitride.

Embodiments of the present invention also include dual or multiple layers serving as the protective overcoat as, for example, a bilayer of silicon nitride capped with hydrogenated carbon. The protective overcoat is formed on the magnetic medium by conventional techniques as, for example, by sputter-depositing an amorphous hydrogenated carbon film employing a plasma deposition chamber.

Another description of forming a protective overcoat can be found, for example, in U.S. Pat. No. 5,945,191 to Hwang et al.

Typical non-magnetic substrate materials include an aluminum alloy with a layer of amorphous nickel-phosphorous thereon, such as an aluminum-magnesium alloy with a nickel-phosphorous surface coating. Other substrate materials include, lasses, ceramics and glass-ceramic materials, as well as graphite. A magnetic recording layer of the present invention includes typical magnetic recording layers as, for example, a cobalt based alloy layer, such as one or more layers comprising one or more of chromium, platinum, tantalum, niobium, tungsten with cobalt. Other magnetic layer materials contemplated by the present invention include a barium ferrite film and perpendicular recording media. The magnetic layer or layers and underlayer are deposited on the non-magnetic substrate by conventional deposition techniques, as by sputtering techniques preformed in an apparatus containing sequential deposition chambers.

In practicing the present invention, a lubricant topcoat is formed on the recording media by applying a lubricant having at least one polymerizable group thereon to the recording media and polymerizing the lubricant through the UV group on the recording media. In an embodiment of the present invention, the lubricant comprises a fluoropolyether having UV-polymerizable groups or at least an end of the lubricant. Fluoropolyether lubricants of the present invention include compounds having the formula:

A-Z-B wherein Z is a fluoropolyether; A is an alkyl group, alkoxy group, a UV-polymerizable group, or a fluorinated derivative thereof; and B is a UV-polymerizable group. In an embodiment of the present invention, both A and B represent UV-polymerizable groups. UV-polymerizable groups according to the present invention include those moieties that can repeatedly undergo chemical unions with themselves upon exposure to UV radiation. Such groups include, for example, vinyl groups, alkenes, alkynes, acrylyls, epoxy groups, etc. As used herein acrylyls include alkyl substituted and unsubstituted acrylates, such methylacrylates, ethyl acrylates, propyl acrylates. Acrylyls also include alkyl substituted and unsubstituted acrylamides, such as N-alkyl acrylamide, alkylacrylamides, or N-alkyl (alkyl) acrylamides.

Fluoropolyethers of the present invention include homopolymers, random polymers or block polymers, i.e. the repeating units of the fluoropolyether, Z, may be the same or different. In addition, different repeat units of Z can be randomly distributed along the backbone of the polymer or distributed as a block of one type of repeat unit and subsequent blocks of different repeat units along the backbone of the polymer. The inventive lubricants can be completely fluorinated or partially fluorinated and can be linear or branched. In an embodiment of the present invention, Z is a perfluoropolyalkylether comprising a plurality of —$(C_aF_{2a}O)_n$— repeating units, wherein subscript a is independently in each such unit an integer of from 1 to about 10 and n is an integer from 2 to about 100. In an embodiment of the present invention is an integer from about 5 to about 80, e.g. from about 10 to about 60.

Fluoropolyether lubricants having at least one UV-polymerizable group are commercially available or cat be prepared by conventional synthetic chemistry. Representative fluoropolyalkylethers of the foregoing have the following structures:

wherein ach of n and m are 1 to about 200 and X is hydrogen or fluorine. Fluoropolyalkylethers are commercially available and can be prepared as described in the U.S. Pat. Nos. 4,681,925 and 3,814,741.

In an embodiment of the present invention, the fluoropolyether lubricants have a number average molecular weight of about 500 to about 20,000 a.m.u., e.g., about 1,000 to about 8,000 a.m.u.

In practicing the present invention, the fluoropolyether lubricants can be applied to a protective overcoat of a magnetic recording medium in any convenient manner, as by dip coating the medium in a solution of the lubricant in a conventional organic solvent or by applying a solution of the lubricant over the medium. Conventional spray, wipe and vapor coating techniques for applying the lubricants are also contemplated by the present invention.

In an embodiment of the present invention, the lubricant is dissolved in a conventional solvent, such as Freon, Vertrel XF or perfluorohexane (solvents available from DuPont), in a ratio of about 0.0001% to about 100% by (weight/weight), e.g. about 0.001% to about 1%. A typical magnetic recording medium, for example, a composite comprising a non-magnetic substrate having sequentially deposited on each side thereof an underlayer, a magnetic layer, and a protective carbon overcoat, is submerged in the lubricant solution and then slowly withdrawn therefrom. In practicing the present invention, one can employ a conventional lifter-type dipper to submerge the composite in the lubricant solution One having ordinary skill in the art can easily optimize the duration of submergence and the speed of withdrawal to achieve a desired coating thickness.

After application of the fluoropolyether lubricant having at least one UV-polymerizable group, the fluoropolyether is then polymerized and/or cross-linked in accordance with the number of polymerizable moieties on the fluoropolyether, e.g., two or more of such moieties. Polymerization can be carried out by the application of conventional UV radiation, with heat and with or without catalysts or photoinitiators. The resulting photopolymerized lubricants tend to exhibit a high contact angle result and excellent wear resistance as lubricant topcoats on magnetic media.

In an embodiment of the present invention, fluoropolyethers having at least one vinyl moiety is advantageously polymerized directly on the surface of a protective overcoat of a magnetic recording medium. The fluoropolyether can be polymerized according to photochemical methods, such as ultraviolet (UV) radiation, or by bombardment with a high-energy electron beam. For example, UV radiation can be used to effect polymerization of the fluoropolyether lubricant in an inert atmosphere with or without the use of a photoinitiator. Although the rate of polymerization is enhanced by photoinitiators or sensitizers, adequate polymerization of the lubricant can be attained without their use.

Further, ultraviolet radiation is particularly effective and economical for cross-linking fluoropolyether lubricants with more than one vinyl group, e.g., a fluoropolyether having multiple acrylate groups. It is possible to vary the molecular weights of the starting fluoropolyether and the number of vinyl groups to regulate the degree of cross-linking when a fluoropolyether having multiple polymerizable groups is employed to form the topcoat lubricant.

In an embodiment of the present invention, the lubricated magnetic recording medium is exposed to UV radiation from a low-pressure mercury lamp (UV lamp) which emits radiation between the range of about 185 nm to about 400 nm. In one aspect of the present invention, shorter (higher energy) wavelengths can be excluded by the use of masks to block out such radiation so that the lubricant can be exposed to UV radiation substantially free of wavelengths of 185 nm or less, e.g., substantially free of wavelengths of 200 nm or less.

In an embodiment of the present invention, the lubricated disk is exposed to UV radiation having an intensity of about several to about 100 or more milliwatts/cm² for an exposure duration of approximately 5 seconds to about several minutes to form a polymerized fluoropolyether lubricant topcoat.

EXAMPLES

Lubricants having two UV polymerizable groups can be prepared by combining Zdol with acryloyl chloride and triethylamine at room temperature, as schematically shown below:

wherein m is about 1 to about 50; n is about 1 to about 50 and X represents either hydrogen or fluorine. The Zdol can have number average molecular weight ranges from about 1000 to about 8,000 Daltons. Acryloylchloride is commercially available and will readily react with the Zdol in the presence of triethylene at room temperature. The reaction is permitted to stir for about one hour followed by standard work-up, which includes extraction of the organics and a vacuum distillation to yield a clear oil of the diacrylate Zdol in high yields and high purity.

Figure 1:
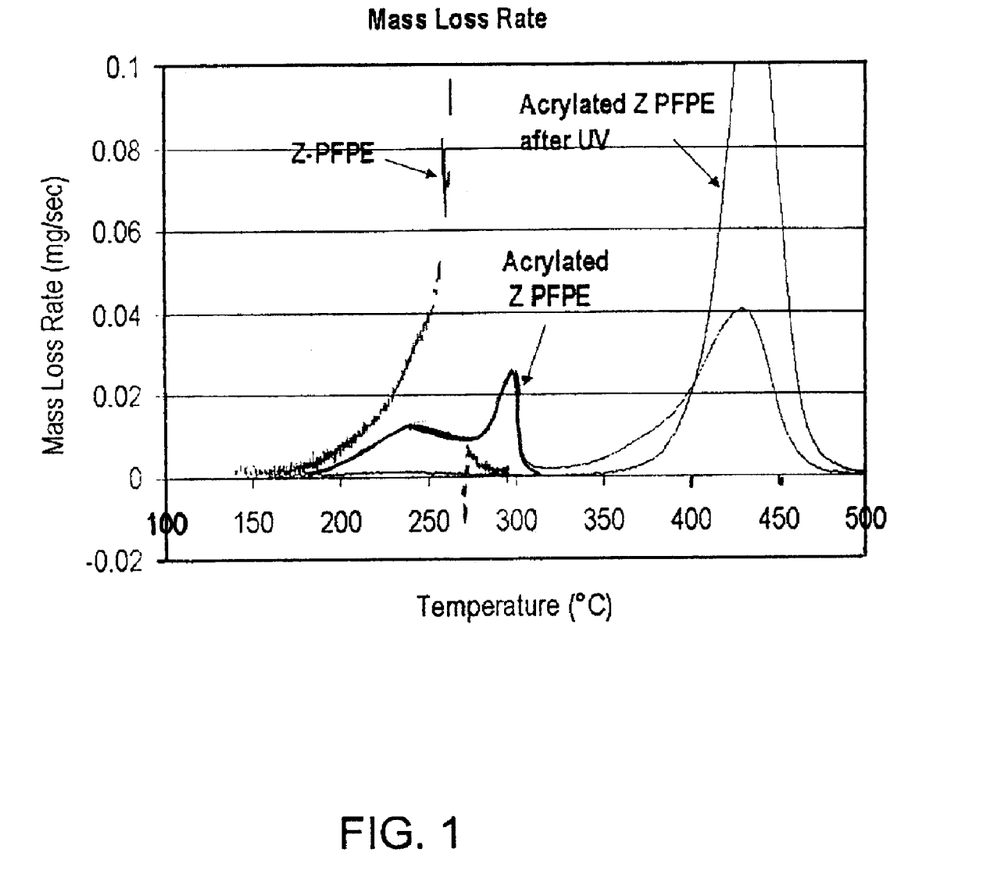
FIG. 1 graphically illustrates mass loss rates for several lubricants.

Evidence of a direct reaction among the UV-active endgroups is substantiated by testing products prepared by irradiating a bulk liquid sample of an acrylated Zdol. Under these conditions, there is no surface to provide photoelectrons. The evaporation rate of this lubricant was measured before and after UV irradiation by thermogravimetric analysis (TGA). The analysis was run in the presence of $Al_2O_3$ which is known to catalytically decompose Zdol lubricants. FIG. 1 illustrates mass loss rates as a function of temperature for three Zdol lubricants in the presence of $Al_2O_3$. These samples include: alcohol derivatized Zdol, an Zdol having acrylate endgroups prior to UV exposure, and an Zdol having acrylate endgroups after UV exposure. The sharp rise in the mass loss rate observed for the Zdol at about 260° C. is due to the catalytic decomposition of the Zdol main chain. No such decomposition is seen for either of the acrylated Zdol samples. There are two distinct features in the mass loss versus temperature curves for the acrylated Zdol samples. The lower temperature peak is due to evaporation and the higher temperature peak is due to decomposition that was thermally cross-linked as a result of the temperature ramp in the experiment. The TGA curve for the acrylated Zdol sample subjected to UV irradiation, however, is markedly different. The results show, that the evaporated mass loss of the acrylated Zdol is markedly reduced while the mass loss peak associated with the lubricant after it would undergo cross-linking is increased.

The diacrylate lubricant can be dissolved in fluorinated solvent at about 0.01°, to about 1% by weight to form solutions of the lubricant in the solvent. The lubricant solutions can be applied directly to amorphous carbon protective layers of magnetic recording media for example, by using a dip-coat technique, i.e. by dipping the media in the solution and slowly withdrawing the media from the solution to yield a lubricated amorphous carbon layer.

The thickness of the lubricant on the media was controlled by varying the rate of withdrawal and/or solution concentration to yield thicknesses in the range of about 10 Å to about 50 Å.

Figure 2:
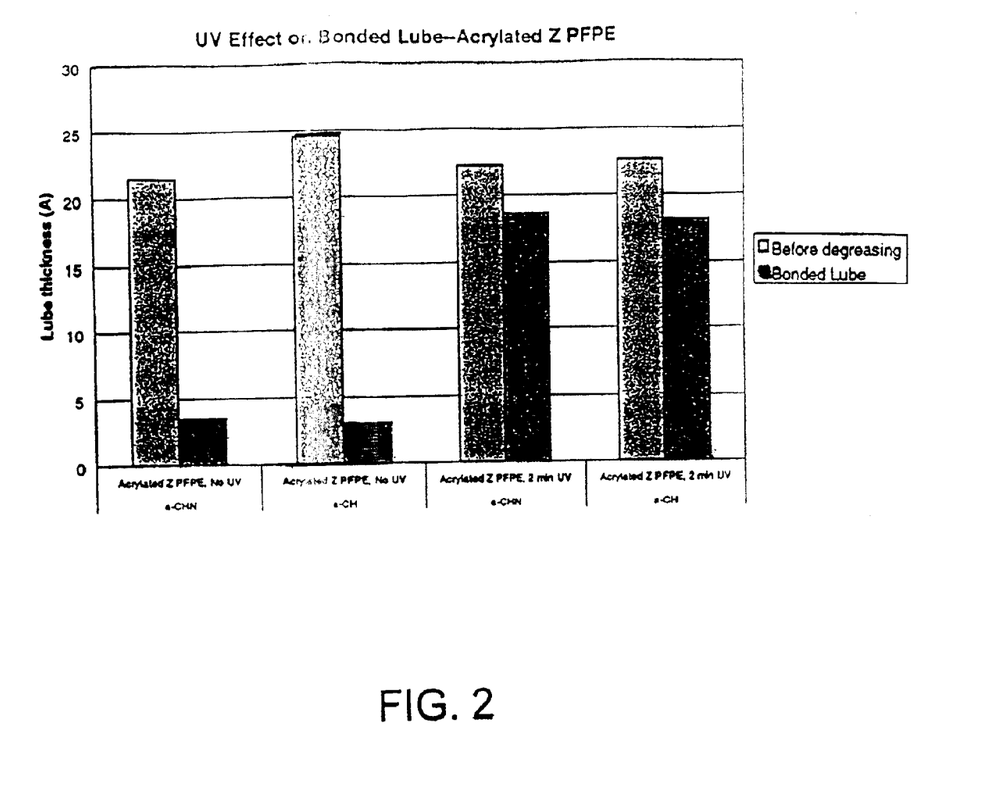
FIG. 2 shows the effect of UV radiation on the thickness of bonded lubricants.

Evidence for the surface reaction of the acrylated Zdol comes from measurement of the lubricant bonding on a carbon overcoat before and after UV irradiation. The lubricant bonding was qualitatively determined by measuring the lubricant remaining after vapor decreasing lubricated discs in decafluoropentane (Vertrel XF, DuPont). The bonding was evaluated on hydrogen-doped (hydrogenated) and hydrogen/nitrogen-doped (hybrid) carbon overcoats, at an initial lubricant thickness of 20–25 Å. Before UV irradiation, the acrylated Zdol is weakly bonded to the carbon surface, with only 3 Å remaining after degreasing. After 2 minutes of UV exposure, the bonded lubricant thickness increases to 18 Å (FIG. 2).

Figure 3:
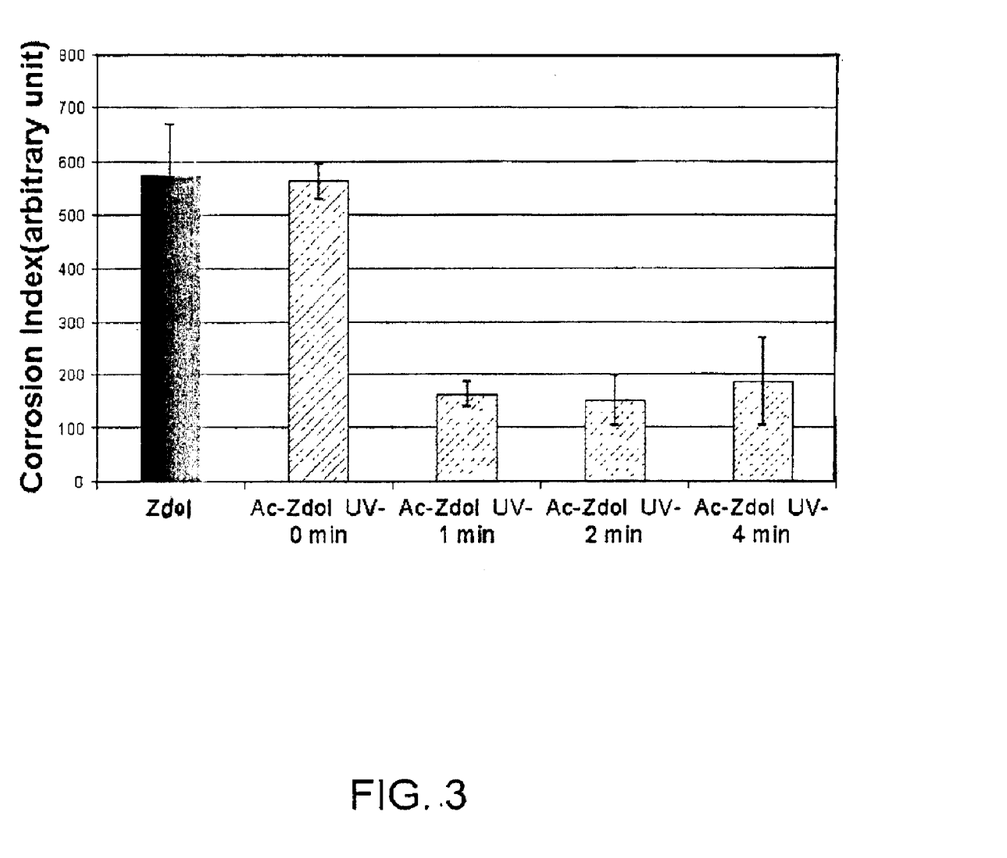
FIG. 3 graphically illustrates the total corrosion charge associated with lubricants on a substrate with and without subjecting them to UV radiation.

The corrosion resistance of the acrylated Zdol lubricant was evaluated by a potentiostatic corrosion test. In this test the media is exposed to a NaCl solution and a constant potential is applied. The total charge passed by the media surface over a fixed acrylated Zdol %% as again evaluated on both hydrogenated and hybrid carbon overcoats. FIG. 3 shows that the total corrosion charge is reduced by at least a factor of two after 2 minutes UV irradiation of the acrylated Zdol. The overall corrosion charged of lubricant films prepared according to an embodiment of the present invention can be less than 250 μC and even less than about 100 μC.

Figure 4:
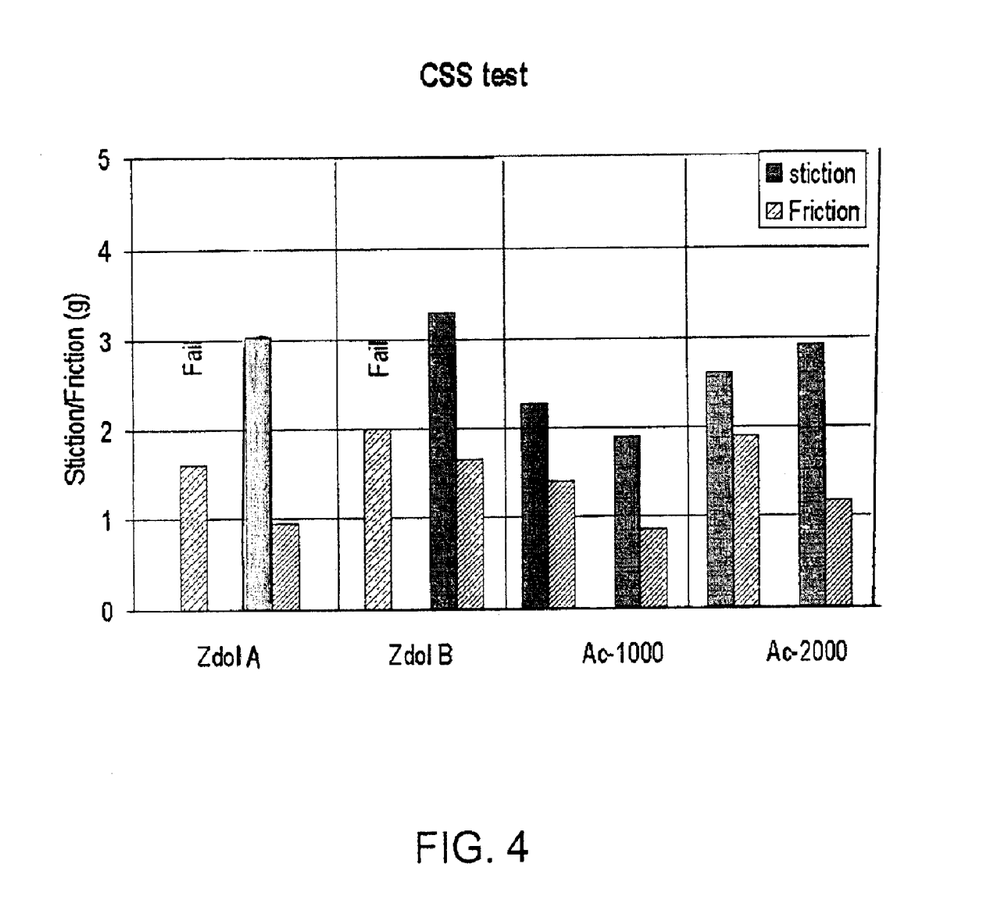
FIG. 4 shows comparative ambient CSS test results of media lubricated with either Zdol, Z-tetraol or with an acrylated Zdol subjected to UV irradiation.

The wear resistance of the lubricant was evaluated in CSS testing at ambient temperature and humidity. In this test, two molecular weight grades of acrylated Z lubricant were deposited on media at 20 Å thickness, and compared to Zdol and Z-tetraol FIG. 4 shows that after UV exposure, the acrylated lubricant exhibits low stiction and friction values, comparable to or better than Zdol and Z-tetraol, e.g., the lubricant films prepared according to an embodiment of the invention have a stiction of less than 3 g and a friction of less than 2 g. Moreover, all four of the discs that were coated with UV irradiated acrylated Z lubricant survived 10,000 CSS cycles, while two of the four Zdol/Ztetraol discs failed.

Figure 5:
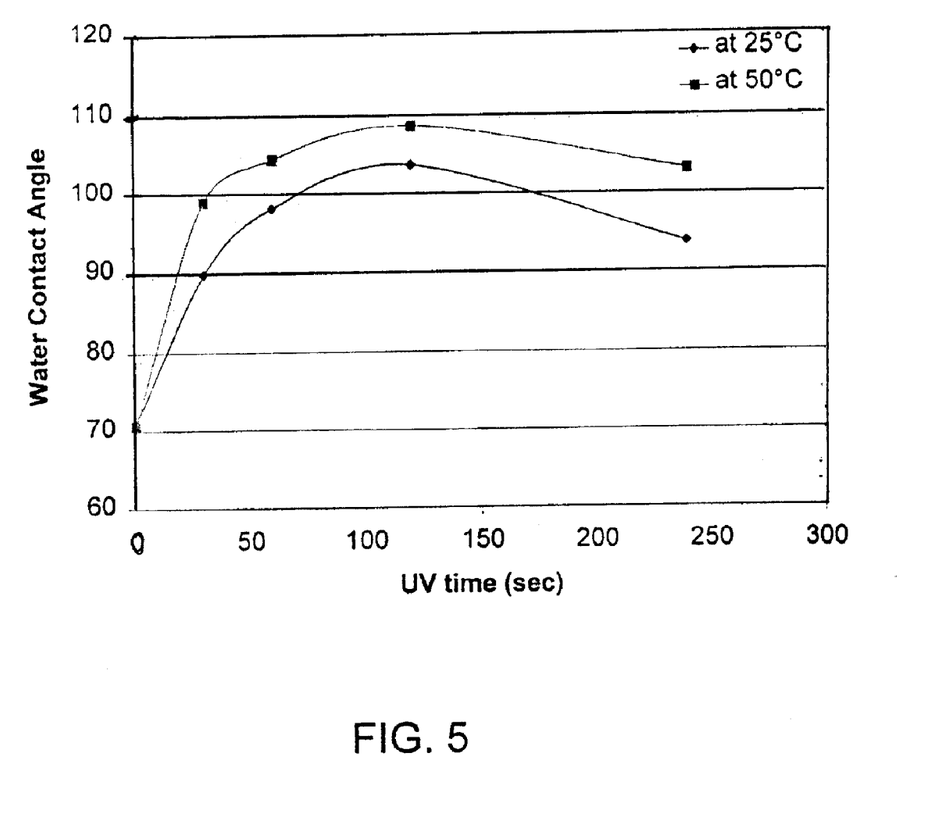
FIG. 5 graphically illustrates comparative results of water contact angles between polymerized lubricants formed by exposing the lubricants to UV radiation while heating at either 25° C. or 50° C.
Figure 6:
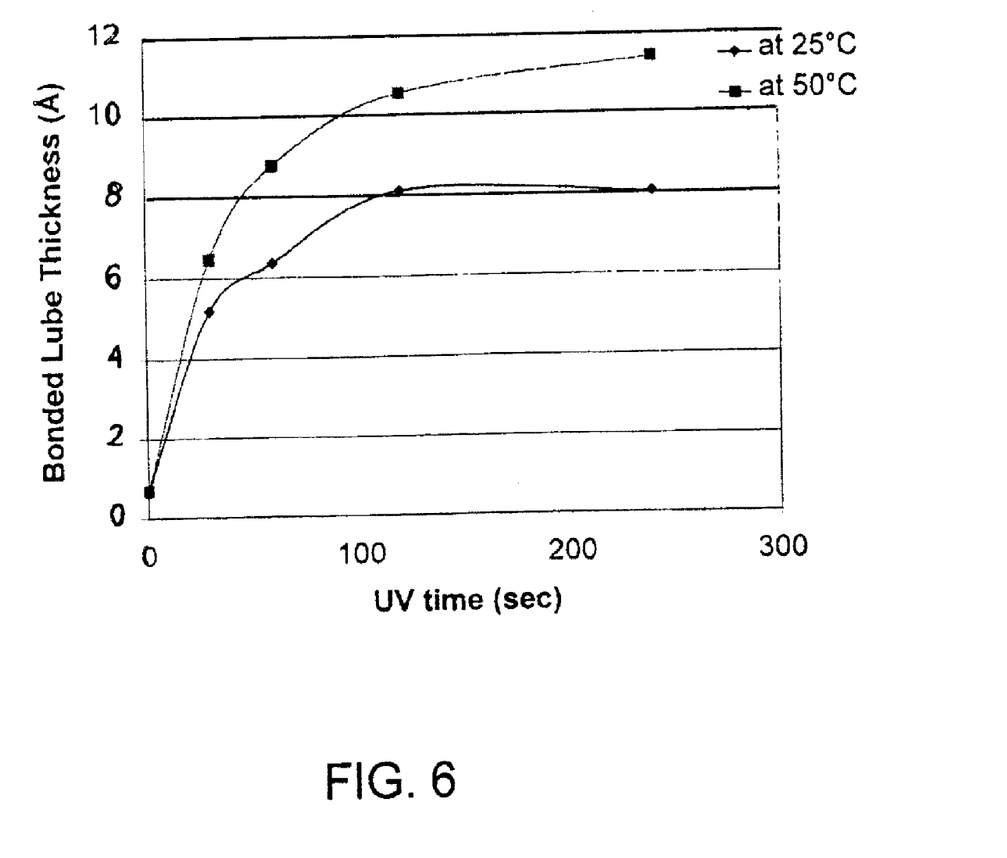
FIG. 6 slows comparative results of bonded lubricant thicknesses between two polymerized lubricants formed by exposing the lubricants to UV radiation while heating at either 25° C. or 50° C.

Several carbon coated disks were provided with a thin layer of diacrylated Zdol lubricant. The disks were heated at either 25° C. or 50° C. and exposed to UV radiation from a mercury lamp source providing an intensity at about 35 mw/cm². Conventional contact angle measurements were taken from the resultant polymerized lubricants. A plot of the contact angle of the polymerized lubricants versus UV exposure times for the 25° C. or 50° C. heated disks are shown in FIG. 5. As shown, exposing the lubricant layer to higher temperatures results in higher contact angles overall and generally takes less time to achieve. FIG. 6 illustrates the increase in bonded lubricant thickness of the same samples.

The present invention is not limited to any particular type of magnetic recording medium but can be employed in any of various magnetic recording media, including those wherein the substrate or a subsequently deposited base layer has been textured, as by mechanical treatment or by laser techniques, and the textured surface substantially reproduced on subsequently deposited layers. Thus, a lubricant prepared in accordance with the present invention, can be applied to form an elastomeric lubricant topcoat, such as a cross-linked elastomeric topcoat directly on the surface of a protective overcoat of a magnetic recording medium, but is not necessarily limited thereto.

Only preferred embodiments of the present invention and examples of their versatility are shown and described in the present disclosure. It is to be understood that the present invention is capable of use in various other combinations and environments and is capable of equivalent changes or modifications within the scope of the inventive concept as expressed herein. It is further understood that the description of the invention was not intended to limit the scope of the claimed subject matter but was provided to enable those skilled in the art to make and use the invention without undue experimentation.

What is claimed is:

1. A method of forming a lubricant film on a recording medium, the method comprising:
   applying a lubricant having at least one UV-polymerizable group on the recording medium;
   heating the recording medium; and
   exposing the lubricant to UV radiation to polymerize the lubricant, wherein the lubricant comprises a fluoropolyalkylether having one or more acrylyl groups.

2. The method according to claim 1, comprising heating the recording medium from about 50° C. to about 150° C.

3. The method according to claim 1, comprising forming a protective overcoat on the recording medium prior to applying the lubricant.

4. The method according to claim 3, comprising forming a carbon containing layer as the protective overcoat.

5. The method according to claim 3, comprising forming an amorphous carbon layer as the protective overcoat.

6. The method according to claim 1, wherein the UV radiation is substantially free of wavelengths less than 200 nm.

7. The method according to claim 1, wherein the fluoropolyalkylether comprises a plurality of —$(C_aF_{2a}O)_n$— repeating units, wherein subscript a is independently in each such unit an integer of from 1 to about 10 and n is an integer from 5 to about 80.

8. The method according to claim 1, wherein the fluoropolyalkylether comprises a compound having the formula:

wherein each of n and m are 1 to about 200 and X is hydrogen or fluorine.

9. The method according to claim 1 wherein the recording medium comprises a substrate, a magnetic layer thereon and a protective coating on the magnetic layer wherein the lubricant is applied to the protective coating.

10. A method of forming a lubricant film on a substrate, the method comprising:
    applying a lubricant having at least one UV-polymerizable group on the substrate;
    heating the substrate or lubricant; and
    polymerizing the lubricant by exposing the lubricant to UV radiation, wherein the UV radiation is substantially free of wavelengths less than 200 nm.

11. The method according to claim 10, comprising exposing the lubricant to UV radiation having wavelengths from 200 nm to about 400 nm.

12. The method according to claim 10, comprising heating the substrate or lubricant with an infrared heating source.

13. The method according to claim 10, comprising heating the substrate to above about 30° C.

14. The method according to claim 10, comprising heating the substrate from about 50° C. to about 150° C.

15. The method according to claim 10, comprising heating the lubricant from about 50° C. to about 150° C.

16. A method of forming a lubricant film on a magnetic recording medium, the method comprising:
    applying a lubricant having at least one UV-polymerizable group on the magnetic recording medium;
    heating the magnetic recording medium; and
    polymerizing the lubricant by exposing the lubricant to UV radiation, wherein the UV radiation is substantially free of wavelengths at 200 nm or less.

17. The method according to claim 16, comprising heating the magnetic recording medium from about 50° C. to about 150° C., wherein the magnetic recording medium comprises a substrate, a magnetic layer thereon and a protective coating on the magnetic layer.

18. The method according to claim 17, comprising exposing the lubricant to UV radiation having wavelengths from 200 nm to about 400 nm.

19. The method according to claim 18, wherein the lubricant comprises a fluoropolyalkylether having at least two acrylyl groups.

20. The method according to claim 16, wherein the polymerized lubricant has a total corrosion charge of less than 250 µC and a stiction of less than 3 grams.

* * * * *